United States Patent [19]

Nishiwaki et al.

[11] Patent Number: 4,731,664
[45] Date of Patent: Mar. 15, 1988

[54] METHOD AND ARRANGEMENT FOR REFRESHING A FRAME MEMORY IN AN INTERFRAME ENCODING SYSTEM

[75] Inventors: Mitsuo Nishiwaki; Shuzo Tsugane, both of Tokyo; Naoki Mukawa; Hideo Kuroda, both of Kanagawa, all of Japan

[73] Assignee: NEC Corporation, Japan

[21] Appl. No.: 794,667

[22] Filed: Nov. 4, 1985

[30] Foreign Application Priority Data

Nov. 8, 1984 [JP] Japan ............................ 59-235906

[51] Int. Cl.[4] .................... H04N 7/12; H04N 7/04
[52] U.S. Cl. .................................. 358/133; 365/222; 358/141; 358/136
[58] Field of Search ............... 358/141, 135, 136, 133, 358/12, 13, 142, 160; 365/222, 230; 340/250, 298

[56] References Cited

U.S. PATENT DOCUMENTS

| 4,051,530 | 9/1977 | Kuroda et al. | 358/136 |
| 4,125,873 | 11/1978 | Chesarek | 358/133 X |
| 4,183,058 | 1/1980 | Taylor | 358/140 X |
| 4,183,096 | 1/1980 | Cenker et al. | 365/222 |
| 4,357,686 | 11/1982 | Scheuneman | 365/222 |

*Primary Examiner*—James J. Groody
*Assistant Examiner*—Victor R. Kostak
*Attorney, Agent, or Firm*—Laff, Whitesel, Conte & Saret

[57] ABSTRACT

A video signal frame memory is refreshed without requiring either a separate transmission line or the transmission of bursts of data. This is done by dividing the frame signals into blocks of data, which are further divided into lines and sub-blocks. During each frame, refreshing signals are sent on a sub-block basis, thereby distributing the refreshing control signals and preventing many signals from being sent in bursts.

12 Claims, 6 Drawing Figures

METHOD AND ARRANGEMENT FOR REFRESHING A FRAME MEMORY IN AN INTERFRAME ENCODING SYSTEM

BACKGROUND OF THE INVENTION

The present invention relates to a method and an arrangement for refreshing a frame memory in an interframe encoding system.

In a television system, thirty frames of video signals are transmitted in one second, with a 33 msec. time interval between two successive frames. There is little variation from one frame to the other. In the particular case of video signals televising a conference (hereinafter referred to as "TV conference signals"), video signals of two successive frames differ very little since participants very rarely exhibit motions. With such video signals, considerable compression of frequency bandwidth is effected by taking a difference between two frames and transmitting only the difference from the areas of motions. This is known as an "interframe encoding system."

In the prior art interframe encoding system, a frame of video signals is segmented into blocks, each of which has a size of m lines x n picture cells (pixels). When all the pixels in one block are, for example, static, the block is then considered as being ineffective and an ineffective block signal is transmitted. On the other hand, when a block contains areas of motion, the block is considered as being effective and an effective block signal is transmitted. At the same time, the difference between the pixels contained in the effective block is quantized and encoded to be transmitted to the receiving side. Details of such a block encoding system are available in the conference record of the *International Conference on Digital Satellite Communications,* 1975, pp. 309–314, under the title of "H-1 NETEC SYSTEM: INTERFRAME ENCODER FOR NTSC TELEVISION SIGNAL" (reference 1) by T. Ishiguro et al.

In the prior art interframe encoding system, as described above, the interframe difference alone is transmitted. At the receiving side, the interframe difference is added to the content from a frame memory to reproduce the original video signal. If a code error occurs in a transmission line, the original video signal cannot be reproduced precisely at the receiving side because the interframe difference which is transmitted differs from the interframe difference received at the receiving side. The effect of such a code error in the transmission line continues until the contents of the frame memories at the transmitting and receiving sides become identical. It is, therefore, necessary to refresh the contents of the frame memories with updated data. Such a technique is generally termed as the refreshing of a frame memory.

The conventional refreshing methods can roughly be classified into two classes:

(i) A "demand" refreshing method is one in which the contents of the frame memories of both transmitting and receiving sides are refreshed (1) by transmitting, via an additional transmission line, a refreshing demand signal, and (2) by synchronizing the refreshing of the two frame memories when a code error on the transmission line is detected at the receiving side.

(ii) A "periodic" refreshing method in which a command signal, instructing a refreshing of the frame memory at the receiving side, is supplied periodically from the transmitting side at given intervals irrespective of code error occurrences on the transmission line.

However, since the demand refreshing method requires an additional transmission line for sending the refreshing demand signal from the receiving side to the transmitting side, the demand method cannot be employed in a one-way communication system which is not provided with such an additional line. A periodic refreshing method is described in U.S. Pat. No. 4,051,530 (reference 2). The difference between the pixels is taken for each pixel, thereby requiring an enormous amount of refreshing data to finish the refreshing of all the frame memory contents. It has, therefore, been a common practice to limit the number of pixels per frame to be refreshed to, for example, those pixels required for five lines. However, this common practice is still defective since a large amount of the refreshing data for pixels in five lines will be produced at one time. Thus, a necessary video signal which is indicative of the movements of an object cannot be adequately transmitted. For example, assume that the refreshing data consists of an 8 bit PCM data per pixel, the number of pixels per line is 455, and the number of lines to be refreshed per frame is five lines. Then, the refreshing data amounting to as much as $5 \times 455 \times 8 = 18,200$ bits will occur all at once, in a burst. That amount corresponds to approximately 36% of 50 Kbits, which is the approximate transmission capacity per frame period, when a video signal is transmitted at 1.5 Mb (thirty frames)/s, making it difficult to transmit sufficient motion of the object, as mentioned above.

SUMMARY OF THE INVENTION

An object of the present invention is to provide a method for refreshing a frame memory which prevents refreshing data from being produced all at once.

According to one aspect of the present invention, there is provided a method for refreshing a frame memory which is used in a system for efficiently encoding video signals. The video signal stored in the frame memory is divided into n number of blocks, which in turn, comprise m number of lines each. Each of the blocks is further segmented into l number of sub-blocks. Each of the sub-blocks is refreshed once for every one frame, repeating l number of times to complete refreshing one block. By repeating such a block refreshing for n number of times, the frame memory can be refreshed.

The above and other objects, features and advantages of the present invention will become apparent from the following detailed description when taken with the accompanying drawings.

DESCRIPTION OF A PREFERRED EMBODIMENT

Figure 1A:
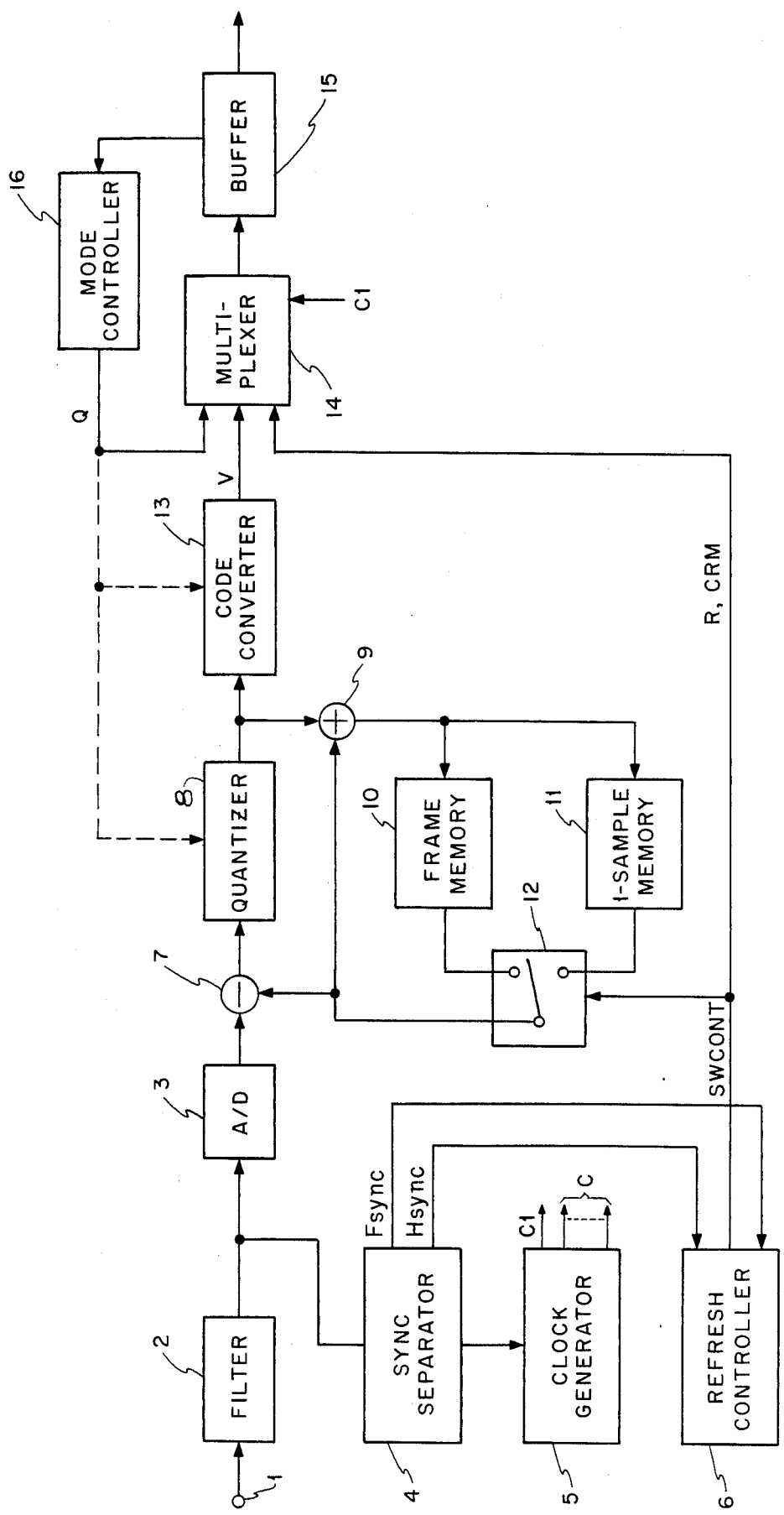
FIGS. 1A and 1B are block diagrams showing one embodiment of the present invention.

Referring now to FIG. 1A, a video signal supplied to an input terminal 1 is band limited with a low-pass filter 2, and then is supplied to an analog-to-digital "A/D"

converter 3 and a synchronization ("synch") signal separator 4. The sync separator 4 separates from the video signal a horizontal sync signal ("H sync") and a frame sync signal ("F sync").

Responsive to the H sync signal and F sync signal, a clock generator 5 generates various clock pulses (C) which are necessary for encoding. Generator 5 supplies the clock pulses to circuits which require them. The clock generator 5 also generates a multiplexer control signal (C1) which is necessary for controlling a multiplexer 14. A refreshing controller 6 is responsive to the H sync and F sync signals and generates a refreshing control signal R, a line indication signal CRM for designating lines to be refreshed, and a switch control signal SWCONT. Both the signals R and SWCONT are described later.

The A/D converter 3 samples an analog video signal and converts the sample into an 8 bit PCM signal, per pixel. A prediction signal from a switch 12 is subtracted from the PCM signal in a subtractor 7 to produce the difference which is then quantized in a quantizer 8 in accordance with a predetermined quantization characteristic. The quantized output is added to the prediction signal from the switch 12 in an adder 9, to obtain a locally decoded signal. The locally decoded signal is stored in a frame memory 10 and in a one-sample memory 11 for generating the prediction signal from the subsequent encoding. The frame memory 10 delays the locally decoded signal by one frame period while the one sample memory 11 delays the same decoded signal by one sample period. The switch 12 receives the prediction signals from the frame memory 10 and from the one sample memory 11. Depending on the switch control signal SWCONT from the refreshing controller 6, switch 12 selects either the output from the one sample memory 11 when refreshing is required or the output from the frame memory 10 when refreshing is not necessary. The prediction signal from the switch 12 is supplied to the subtractor 7 and the adder 9.

The quantizer 8 supplies a signal which is indicative of the quantization level to a code converter 13. When there is no difference between (1) each pixel in one block comprising m lines x n pixels, and (2) each corresponding pixel of the previous period, the code converter 13 deems the block as being ineffective. Responsive thereto, code converter 13 gives an ineffective block signal alone and deems all the other blocks effective. For the effective block, the code converter 13 converts, in succession to an effective block signal. The converter quantizes the levels of all the pixels contained in the effective block into codes V, in accordance with the predetermined code assignment. A shorter code word is assigned to a quantization level which occurs at higher probability while a longer code word is assigned to a less probable quantization level.

A mode controller 16 detects the amount of data stored in a buffer memory 15 and controls the amount of code generation in accordance with an encoding mode signal. The mode signal relates to the detected memory amount, which prevents overflow of the buffer memory 15.

More specifically, when the buffer occupancy increases, the mode controller 16 controls the quantizer 8 and causes it to roughly quantize signals. Alternatively, the mode controller 16 selects the coding mode, such as a sub-sampling coding mode, in which every other pixel is coded, instead of coding all of the pixels. A field repeating mode is one in which, instead of coding all of the fields, every other field is coded.

In a time division, the multiplexer 14 multiplexes the F sync signal, the encoded codes V from the code converter 13, the refreshing signal R, the line indication signal CRM from the refreshing controller 6, and the encoding mode signal Q from the mode controller 16. The multiplexed signal is fed to a buffer memory 15. The buffer memory 15 temporarily stores the output from the multiplexer 14, reads out the stored data at a given transmission rate, constructs a transmission frame, and then transmits the constructed frame to a digital transmission line.

Figure 1B:
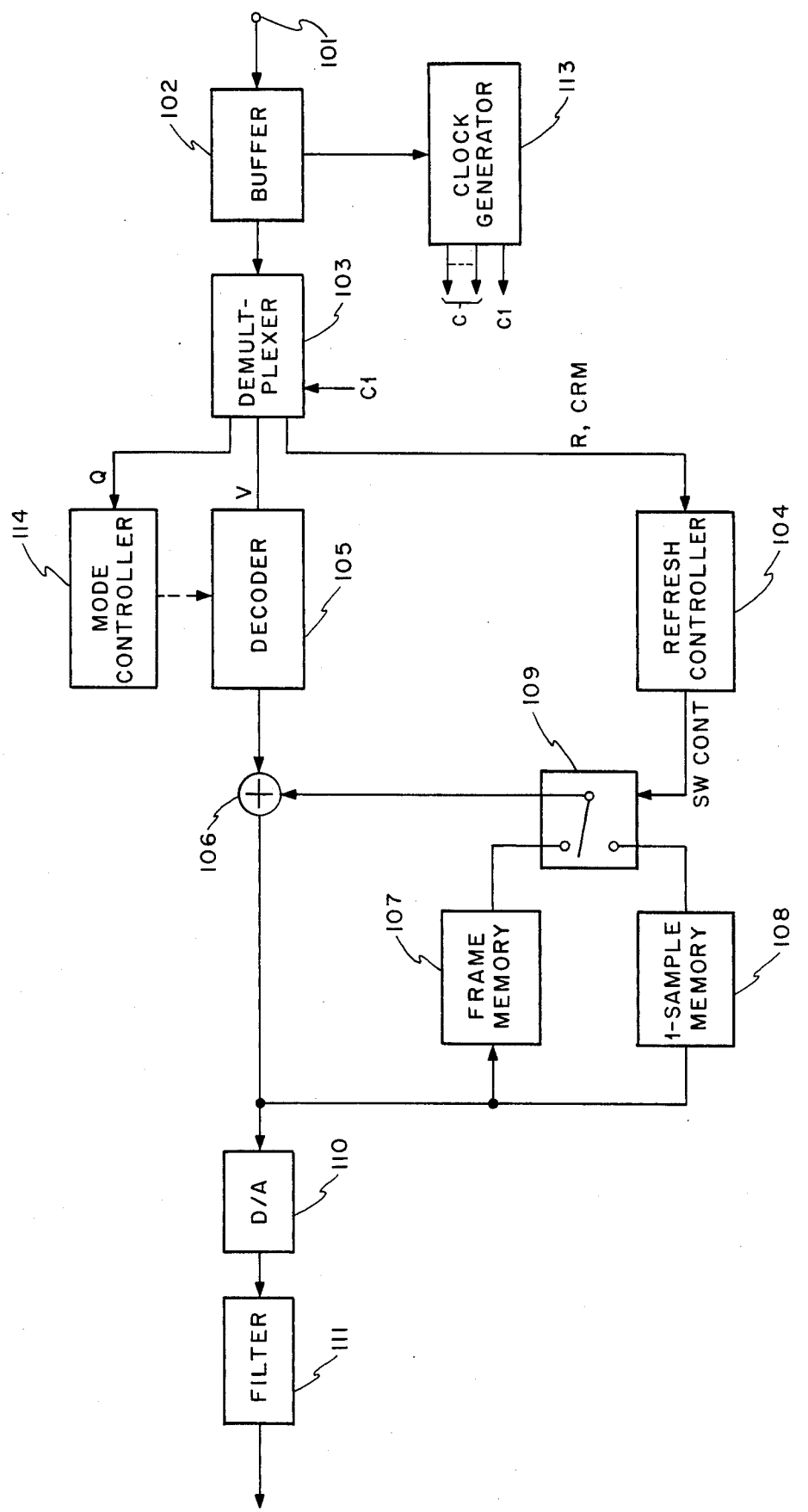

Referring to FIG. 1B, at the receiving side, the transmitted video signal is supplied to a terminal 101 and is stored in a buffer memory 102. A clock generator 113 extracts clock data from the transmitted signal and generates, on the basis of that extracted clock data, various clock pulses (C, C1) which are required for decoding and supplies them to the necessary circuits.

A demultiplexer 103 responds to the clock pulse C1 by reading out data from the buffer memory 102 and by supplying: (1) the encoding mode signal Q to a mode controller 114, (2) the refreshing control signal R and the line indication signal CRM to a refreshing controller 104, and (3) the ineffective or effective block signal and the encoded codes V to a decoder 105, respectively. The mode controller 114 controls the decoding mode according to the encoding mode signal Q so that the decoding mode corresponds with the encoding mode used at the transmitting side, such as the sub-sampling mode or field repeating mode. In response to the refreshing signal R and the line indication signal CRM, a refreshing controller 104 produces the switch control signal SWCONT to a switch 109 synchronously with the switching operation of the switch 12 at the transmitting side. The decoder 105 decodes the ineffective or effective block signal and the code V to a decoded signal.

An adder 106 obtains the original digital video signal by adding the decoded signal from the decoder 105 and the prediction signal from the switch 109 and supplies the same to a digital-to-analog ("D/A") converter 110, a frame memory 107, and a one sample memory 108, respectively. The frame memory 107 has one frame delay, while the one sample memory 108 has one sample delay.

In response to the switch control signal SWCONT from the refreshing controller 104, switch 109 selects the prediction signal from the one sample memory 108 when the refreshing is required while selecting the prediction signal from the frame memory 10 when the refreshing is not required. The selected prediction signal is supplied to the adder 106. As a result, during the period of the refreshing, the input of the adder 106 and the input of the one sample memory 108 are added to produce the refreshing data, which is used to refresh the contents of the frame memory 107. In this manner, the influence of the code error in the transmission line can be eliminated. The D/A converter 110 receives the original digital video signal supplied from the adder 106 and converts it into the original analog video signal. This analog video signal is band limited by a low-pass filter 111 and transmitted to a video signal output terminal 112.

The method for designating lines to be refreshed will now be explained in relationship to the method for constructing a video frame in the multiplexer 14.

Figure 2:
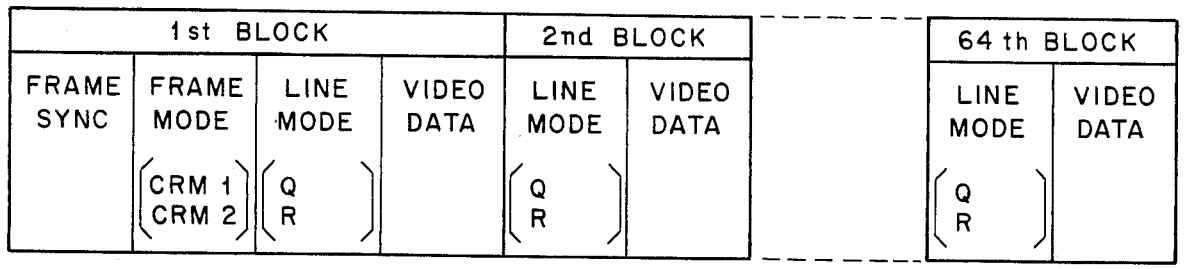
FIG. 2 is an illustration showing the construction of a video frame.

Referring now to FIG. 2, a video frame comprises sixty-four blocks, each of which consists of eight lines. Of these sixty-four blocks, the first block comprises a frame sync signal, a frame mode signal, a line mode signal, and video data. Each of the second through sixty-fourth blocks comprise a line mode signal and video data.

The frame sync signal is assigned with a pattern which never appears with other signals. Thus, it is possible to synchronize the video frames by detecting the pattern from the data sequence. The frame mode contains a signal showing what coding mode is applied to the whole frame, e.g a sub-sampling mode, as mentioned above. The frame mode also contains the line indication signal CRM which designates the lines to be refreshed as mentioned above. The line indication signal CRM is a signal indicative of the serial number of lines refreshed in the block (m lines) in question. If one block consists of eight lines and refreshing is continuously conducted for two lines at one time, then the line indication signal CRM comprises 2 bits. The line mode has a coding mode which is applied to each block (eight lines). The line mode also includes the signal Q showing quantization characteristics supplied from the mode controller 16 and the refreshing control signals R. A "0" at the signal position R indicates that lines requiring refreshing exist, whereas a "1" at the signal position R means that none of the m lines (block) requires refreshing.

Figure 3:
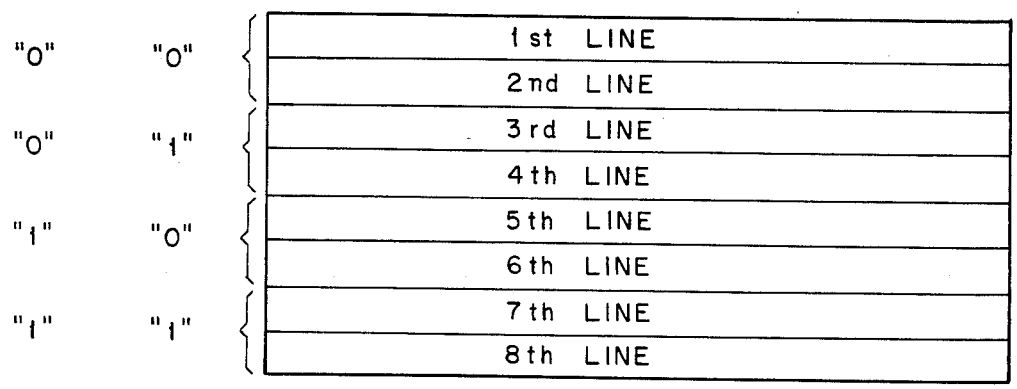
FIG. 3 is an illustration explaining assignment of lines for periodic refreshing.

FIG. 3 is a chart to explain how lines are designated for refreshing. For example, when the bits CRM 1 and CRM 2 of the line indication signal CRM are "1" and "0", respectively, then the fifth and sixth lines of the eight lines are refreshed while the rest of the eight lines are encoded in the coding mode designated by the line mode. As mentioned above, if two lines per each block are refreshed once for one frame, 256 frames will be required to refresh one frame. It should be noted that the structural components of the systems shown in FIGS. 1A and 1B are disclosed in the reference 1 and 2, except for the refreshing controllers 6 and 104. The refreshing controllers 6 and 104 will, therefore, be described in more detail hereinafter.

Figure 4:
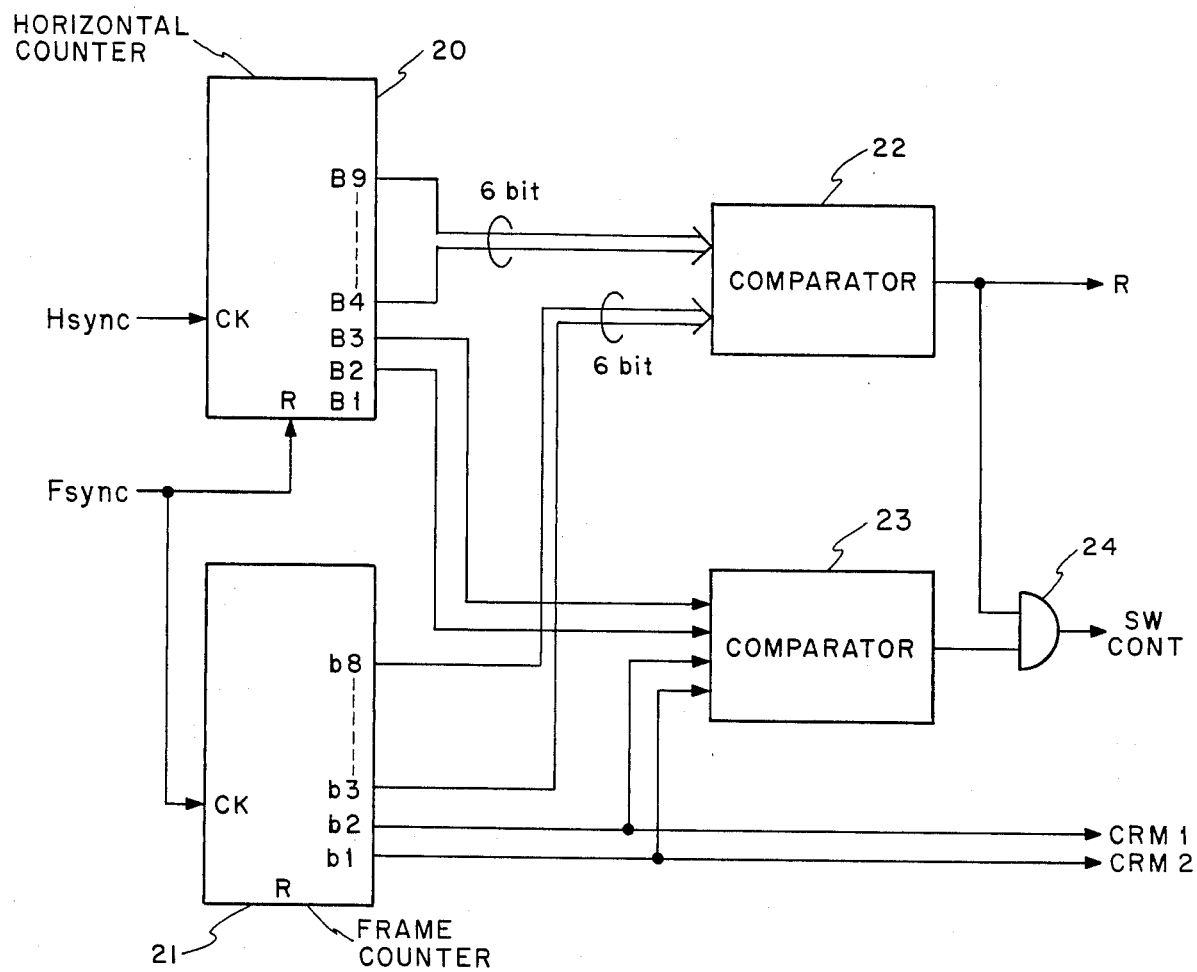
FIGS. 4 and 5 are circuit diagrams of the refreshing controller at the transmitting and receiving sides, respectively.

FIG. 4 shows the refreshing controller 6 at the transmitting side.

Referring to FIG. 4, a counter 20 counts the number of lines in one frame by counting the number of H sync signals supplied from the sync separator 4. A counter 21, on the other hand, counts the number of F sync signals. A first comparator 22 compares the output of the fourth through ninth bits (B4–B9) of the counter 20 with the output of the third through eighth bits (b3–b8) of the counter 21 and produces the refreshing signal R. For example, when the first block is refreshed, the counter output b3–b8 keeps "000000" during the first through fourth frames, while the counter output B4–B9 holds "000000" during the first through eighth lines in each frame from the first through fourth frames. The comparator 22, therefore, produces the refreshing signal R for four times for one block. It is noted that since the first and the second bits (b1–b2) of the counter 21 change from frame to frame, the output b1–b2 is used as the line indication signal having the refreshing bits CRM 1 and CRM 2.

A second comparator 23 and an AND gate 24 form the switch control signal SWCONT for controlling the switch 12 to transmit the output from the one sample memory 11 as refreshing data during the refreshing period. The comparator 23 compares the counter output B2–B3 which does not vary in the first and the second lines of each block as compared with the counter output b1–b2 indicative of the first through fourth frames. Comparator 23 produces a signal corresponding to the lines to be refreshed in the first through fourth frames. For example, when "00" indicating the first frame appears at the output b1–b2, "00" showing the first and second lines appears at the output B2–B3. The comparator 23 compares the outputs B2–B3 and b1–b2, and produces a signal for refreshing the first and second lines.

The AND gate 23 responds to the output of the comparator 23 and the refreshing signal R from the comprator 22 produces the switch control signal SWCONT. Since the signal R is outputted in correspondence with the block position which is to be refreshed once per frame, the switch control signal is outputted to refresh two lines once per frame. As described above, the refreshing control signal R and the line indication bits CRM 1 and CRM 2 are multiplexed by the multiplexer 14 (FIG. 1A).

Figure 5:
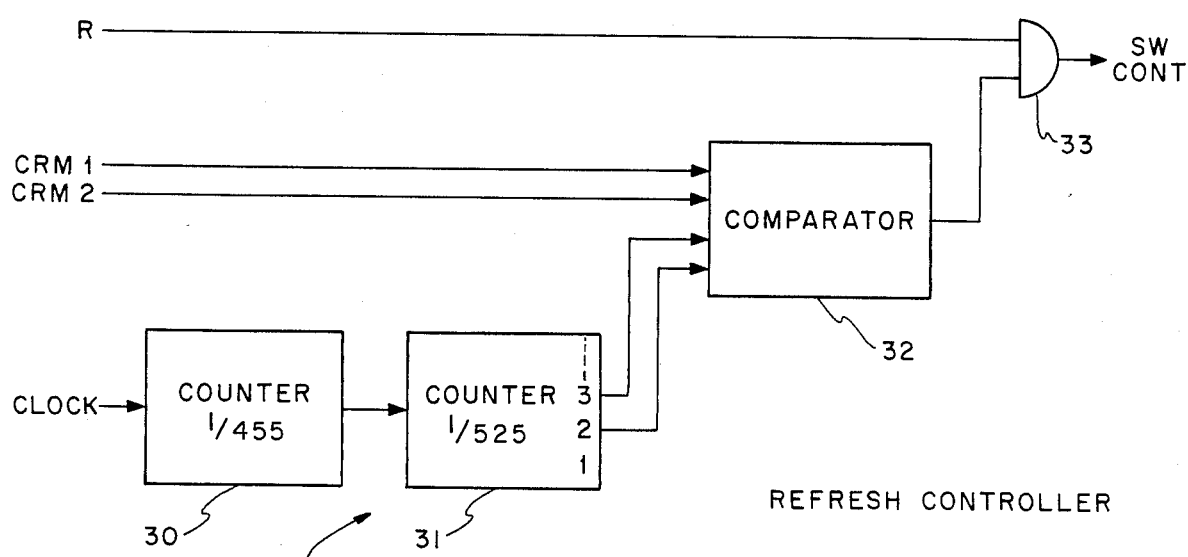

Referring now to FIG. 5 which shows details of the refresh controller 104 at the receiving side. A counter 30 generates an H-synch signal by counting the clock pulses from the clock generator 113 and supplies the H-sync signal to a counter 31 which outputs the number of lines by counting the H-sync signal. Since the output (bs–b3) of the counter 31 changes in every two lines, a line indication signal is obtained at the receiving side by comparing the output b2–b3 in a comparator 32 with the separate line indication bits CRM 1 and CRM 2. An AND gate 33 performs an AND operation in response to the refresh line indication signal and the refreshing signal R to form the switch control signal SWCONT at the receiving side.

Although the method for refreshing a frame memory of a simple interframe encoding system has been described in the foregoing specification, the method can be applied for other encoding systems which incorporate motion compensation, predictive processing, and the like. In the foregoing description, each block which contains a plurality of sub-blocks to be refreshed exists only once in one frame; however, it is again possible that a plurality of blocks containing sub-blocks exist in one frame.

As has been described above, according to the method of the present invention for an interframe encoding system, the block of encoding is further segmented into smaller sub-blocks for periodic refreshing. Thus, refreshing data can be transmitted without producing a burst of data at one time. As a result, the amount of data assigned for transmitting the movements of an object can be increased, for enabling high quality encoding.

Those whose are skilled in the art will readily perceive how to modify the invention. Therefore, the appended claims are to be construed to cover all equivalent structures which fall within the true scope and spirit of the invention.

What we claim is:

1. A method for refreshing a frame memory used in an encoding system for efficiently encoding video signals having cyclically recurring frames, said method comprising the steps of:
    (a) dividing a video signal stored in said frame memory into n number of blocks consisting of m number of lines;

(b) dividing each of said blocks into l number of sub-blocks where l is an integer greater than one;
(c) refreshing one of said sub-blocks once for every one frame;
(d) repeating the step (c) for l number of times to complete a refreshing of one of said blocks; and
(e) repeating the step (d) for n number of times to refresh said frame memory.

2. An arrangement for refreshing transmission and receiving frame memories used in a system for efficiently encoding video signals having cyclically recurring frames, each of said frame memories being divided into n blocks consisting of m lines, each of said blocks being divided into l sub-blocks, l being an integer greater than one, said arrangement comprising:

first control means for generating a refreshing control signal to indicate a need for a refreshing of said transmission frame memory, a sub-block indication signal to designate a sub-block to be refreshed, and a first control signal to control said refreshing of said transmission frame memory;

first refreshing means responsive to said first control signal for refreshing said sub-block designated by said sub-block indication signal with refreshing data;

transmitting means for transmitting said refreshing data, said sub-block indication signal, and said refreshing control signal to a transmission line;

means for separating said refreshing data, said sub-block indication signal and said refreshing control signal from the transmitted signal which is received from said transmission line;

second control means responsive to said sub-block indication signal and to said refreshing signal for generating a second control signal; and second refreshing means responsive to said second control signal for refreshing said receiving frame memory with said transmitted refreshing data.

3. An arrangement as claimed in claim 2, wherein said first control means comprises first counter means responsive to a horizontal sync signal for counting the number of lines of said video signal to produce a first counter output once every m lines, second counter means responsive to a frame sync signal for counting the number of said frames to produce a second counter output once every l frames, first comparator means for comparing the first and second counter outputs to produce said refreshing control signal, third counter means responsive to said horizontal sync signal for counting the number of said lines to produce a third counter output once every m lines, fourth counter means responsive to said frame sync signal for producing said sub-block indication signal, second comparator means for comparing the outputs from the third and fourth counter means, and means responsive to the output from the second comparator means and said refreshing control signal for producing said first control signal.

4. A system for refreshing a frame memory means used for storing video signals having cyclically recurring frames, said system comprising means for dividing said video signals stored in said frame memory means into a plurality of sub-units of video signals, means for deriving control signals relative to each of said stored sub-units of video signals, said control signals indicating whether there is or is not a need for refreshing a corresponding sub-unit of said signals stored in said memory means, and means selectively responsive to said control signals and to a reading of each of said sub-units of said stored video signals for transmitting refreshing and updating video signal data whereby said refreshed data is transmitted in a manner which is distributed over time as distinguished from transmitting data in a burst.

5. The system of claim 4 and means for providing said sub-units of said video signals by:
(a) storing said video signals in said frame memory means in n number of blocks consisting of m number of lines; and
(b) storing each of said blocks in l number of sub-blocks.

6. The system of claim 5 and means for generating said control signals to refresh one of said sub-blocks once for every one frame; said control signals repeating (a) l number of times to complete the refreshing one of said blocks; and (b) m number of times to refresh said frame memory.

7. The system of claim 6 wherein said video signals have horizontal and frame synchronizing pulses, and means for separating said synchronizing pulses from said video signals as they are received, clock means for generating clock pulse signals and multiplex control signals, refreshing controller means responsive to said synchronizing pulses for generating a refreshing control signal and an identification signal for identifying one of said sub-units of data which is to be refreshed, and multiplexer means for transmitting refreshed data identified by said refreshing control signal and said sub-unit identification signal.

8. The system of claim 7 wherein said refreshing controller means comprises first means for counting horizontal synchronizing pulses and second means for counting frame synchronizing pulses, comparator means responsive to said first and second means for producing said control signals whereby refreshing occurs on a basis of a predetermined number of horizontal and frame cycles.

9. The system of claim 8 and means responsive to said refreshing controller means for selectively storing data in said frame memory means and in one sample memory means, and means responsive to said control signals for switching to said data stored in said frame memory means when refreshing is not indicated and to said one sample memory when refreshing is indicated.

10. The system of claim 9 and means for quantizing some refreshing signals which occur with a high probability into relatively short code word signals and other refreshing signals which occur with a less probability into relatively long code word signals.

11. The system of claim 10 and means for buffer storing said code word signals, said means for transmitting refreshed and updated data comprises means for transmitting said buffer stored code words over a transmission line, and means for selecting a mode of encoding which prevents an overflow of said buffer storing means.

12. The system of claim 6 and means responsive to said transmitted refreshed and updated data for buffer storing said data as it is received, means for demultiplexing said buffer stored data into said video signals and said control signals, and means responsive to said demultiplexed control signals for switching between a frame memory means and a one sample memory means.

* * * * *

UNITED STATES PATENT AND TRADEMARK OFFICE
CERTIFICATE OF CORRECTION

PATENT NO. : 4,731,664
DATED : March 15, 1988
INVENTOR(S) : Nishiwaki, et al

It is certified that error appears in the above-identified patent and that said Letters Patent is hereby corrected as shown below:

On the title page assignee should read

--NEC Corporation, Tokyo Japan and Nippon Telegraph and Telephone Corporation, Tokyo Japan --.

Signed and Sealed this

Eleventh Day of October, 1988

Attest:

DONALD J. QUIGG

*Attesting Officer*     *Commissioner of Patents and Trademarks*